(12) United States Patent
Ligman et al.

(10) Patent No.: US 12,671,686 B2
(45) Date of Patent: Jun. 30, 2026

(54) SYSTEMS AND METHODS FOR IMMERSIVE DATA MANAGEMENT IN SPATIAL COMPUTING

(71) Applicant: JPMORGAN CHASE BANK, N.A., New York, NY (US)

(72) Inventors: Joseph Ligman, Weston, CT (US); Elvir Azanli, Union, NJ (US); Pranav Deshpande, Jersey City, NJ (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 179 days.

(21) Appl. No.: 18/616,376

(22) Filed: Mar. 26, 2024

(65) Prior Publication Data

US 2025/0310316 A1      Oct. 2, 2025

(51) Int. Cl.
*H04L 9/40*              (2022.01)

(52) U.S. Cl.
CPC .................................. H04L 63/083 (2013.01)

(58) Field of Classification Search
CPC .... H04L 63/083; H04L 9/3234; H04L 63/108
See application file for complete search history.

(56) References Cited

U.S. PATENT DOCUMENTS

| | | | | |
|---|---|---|---|---|
| 7,673,135 B2 * | 3/2010 | Chin | ....................... | H04L 63/08 726/20 |
| 8,868,915 B2 * | 10/2014 | Counterman | ......... | H04L 63/062 713/176 |
| 10,652,365 B2 * | 5/2020 | Biswas | ................. | G06F 21/577 |
| 10,708,053 B2 * | 7/2020 | Jain | ........................ | H04L 9/3213 |
| 2002/0089508 A1 * | 7/2002 | Sowizral | .............. | G06T 15/005 345/522 |
| 2012/0100912 A1 * | 4/2012 | Kim | ...................... | A63F 13/355 463/31 |
| 2018/0189243 A1 * | 7/2018 | Allyn | .................. | G06F 3/04845 |
| 2018/0189988 A1 * | 7/2018 | Allyn | ..................... | G06T 11/26 |
| 2018/0337784 A1 * | 11/2018 | Jain | ........................ | G06F 21/335 |
| 2020/0358615 A1 * | 11/2020 | Smolny | ................ | H04L 63/102 |

FOREIGN PATENT DOCUMENTS

CN            104183023  B   *   6/2017

\* cited by examiner

*Primary Examiner* — Khalid M Almaghayreh
(74) *Attorney, Agent, or Firm* — GREENBERG TRAURIG LLP

(57)                    ABSTRACT

Systems and methods for immersive data management in spatial computing are disclosed. A method may include: (1) requesting from an identity and access management service executed in a cloud environment, an access token; (2) receiving, from an identity and access management service, the access token comprising user entitlements to access a plurality of elements in a plurality of scenes; (3) requesting one of the plurality of scenes from a scene filtering service, the request comprising the access token; (4) identifying the user entitlements from the access token; (5) retrieving the requested scene comprising a subset of the elements; (6) adding the elements that the user is entitled to based on the user entitlements to a scene to be displayed; (7) returning the scene to be displayed to the computer program; and (8) displaying the scene to be displayed.

15 Claims, 9 Drawing Sheets

100

300

Database
(526)

Identity And
Access
Management
(522)

512    514

Object Storage
(528)

User Electronic Device
(510)

500

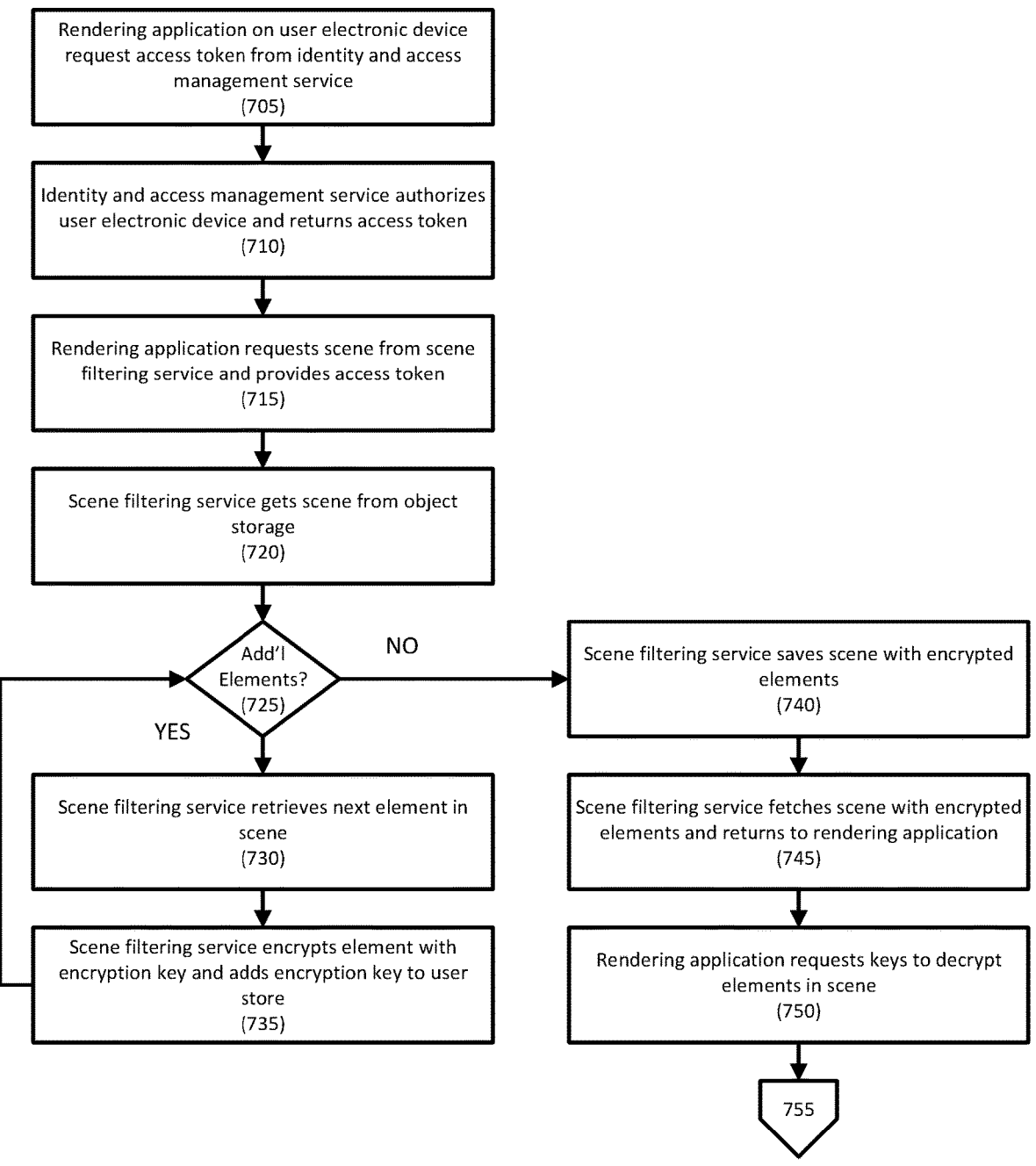

Rendering application on user electronic device request access token from identity and access management service
(705)

Identity and access management service authorizes user electronic device and returns access token
(710)

Rendering application requests scene from scene filtering service and provides access token
(715)

Scene filtering service gets scene from object storage
(720)

Add'l Elements?
(725)

NO

Scene filtering service saves scene with encrypted elements
(740)

YES

Scene filtering service retrieves next element in scene
(730)

Scene filtering service fetches scene with encrypted elements and returns to rendering application
(745)

Scene filtering service encrypts element with encryption key and adds encryption key to user store
(735)

Rendering application requests keys to decrypt elements in scene
(750)

SYSTEMS AND METHODS FOR IMMERSIVE DATA MANAGEMENT IN SPATIAL COMPUTING

BACKGROUND OF THE INVENTION

1. Field of the Invention

Embodiments are generally directed to systems and methods for immersive data management in spatial computing.

2. Description of the Related Art

Data management in enterprises has been long established. Data security practice protects digital information from unauthorized access throughout its lifecycle, and its management encompasses the strategic governing, sharing, and analyzing of data within an organization. Data in an enterprise is typically managed using some form of attribute (ABAC) or role (RBAC) based access control. These are content independent control mechanisms defined around attributes, roles, and privileges.

Role based access control essentially allows users to access a permissioned entity if they have been authorized to do so. Users may also permission resources according to the access control they have been authorized. While attribute-based access control allows access to an entity if the subject, or end-user, has the correct actions required to access a given resource in the specified environment.

For the most part, some form of access control exists for all data managed within an enterprise. These general forms, role and access-based data control are necessary to legally protect an enterprise and the employees within. In most cases, data governance is applied not only to files but to systems-of-record as well. Data regulation is assigned and exists on query results and other data. Within the firm, data owners classify and manage data through any of the following policies: data use, data storage, data quality, data protection, data retention, and data destruction.

These policies are applied to any relevant entity that may be controlled with attributes and entitlements, for example, with more exact specifications such as applied to columns, rows, or even cells of a data from a query result of a system-of-record.

Government policy extends the data use further. General Data Protection Regulation (GDPR) is the European Union regulation on information privacy. Information privacy establishes a relegation between the public's expectation of privacy and the collection and dissemination of data.

Spatial computing represents a new computing paradigm where computer interaction techniques are perceived by users as taking place in the real world, in and around their natural bodies and physical environments. Spatial computing is not only a new computing environment, but the data rendered within this computing paradigm is also spatial in nature. Industry standards have recently emerged to manage the interoperability of spatial computing data, allowing the data to be decoupled from the application state. Despite this, currently, there is no data protection standard, method or specification that exists for managing spatial data and its rendering.

SUMMARY OF THE INVENTION

Systems and methods for immersive data management in spatial computing are disclosed. According to an embodiment, a method may include: (1) requesting, by a computer program executed on a user electronic device and from an identity and access management service executed in a cloud environment, an access token; (2) receiving, by the computer program and from an identity and access management service, the access token comprising user entitlements to access a plurality of elements in a plurality of scenes; (3) requesting, by the computer program, one of the plurality of scenes from a scene filtering service, the request comprising the access token; (4) identifying, by the scene filtering service, the user entitlements from the access token; (5) retrieving, by the scene filtering service, the requested scene comprising a subset of the elements; (6) adding, by the scene filtering service, the elements that the user is entitled to based on the user entitlements to a scene to be displayed; (7) returning, by the scene filtering service, the scene to be displayed to the computer program; and (8) displaying, by the computer program, the scene to be displayed.

In one embodiment, the computer program may include a scene rendering application.

In one embodiment, the scene may be parsed into a plurality of elements, and each of the elements may be associated with a user entitlement.

In one embodiment, the access token may include a JSON token comprising a plurality of claims representing user entitlements to access the elements.

In one embodiment, the scene filtering service may be executed in a cloud environment.

In one embodiment, the elements may be stored in object storage.

In one embodiment, the computer program executed on the user electronic device may include a scene rendering service.

In one embodiment, a scene rendering service executed in the cloud environment renders the scene for the computer program.

In one embodiment, the scene filtering service may be executed in the cloud environment.

According to another embodiment, a system may include: a user electronic device executing a computer program; and a cloud environment executing an identity and access management service, a scene filtering service, and comprising an object storage storing a plurality of scenes and a plurality of elements for the scenes. The computer program requests an access token from the identity and access management service. The identity and access management service provides the access token comprising a plurality of user entitlements to the elements. The computer program requests one of a plurality of scenes from the scene filtering service with the access token. The scene filtering service identifies the user entitlements from the access token, retrieves the requested scene comprising a subset of the elements, adds the elements that the user is entitled to based on the user entitlements to a scene to be displayed, and returns the scene to be displayed to the computer program. The computer program displays the scene to be displayed.

In one embodiment, the computer program may include a scene rendering application.

In one embodiment, the scene may be parsed into a plurality of elements, and each of the elements may be associated with a user entitlement.

In one embodiment, the access token may include a JSON token comprising a plurality of claims representing user entitlements to access the elements.

In one embodiment, the scene filtering service may be executed in a cloud environment.

In one embodiment, the computer program executed on the user electronic device may include a scene rendering service.

In one embodiment, the cloud environment further may include a scene rendering service that renders the scene for the computer program.

In one embodiment, the scene filtering service may be executed in the cloud environment.

According to another embodiment, a method may include: (1) receiving, by a user electronic device associated with a user, a plurality of scenes, wherein each scene may be parsed into a plurality of elements, and each of the elements may be associated with a user entitlement; (2) retrieving, by a computer program executed by the user electronic device, one of the plurality of scenes and the plurality of elements for the scene; (3) determining, by the computer program, that the user is entitled to access each of the plurality of elements based on the user entitlements; (4) adding, by the computer program, the entitled elements to a scene to be displayed; and (5) rendering, by the computer program, the scene to be displayed.

In one embodiment, the plurality of scenes may be embedded in the computer program.

In one embodiment, the plurality of scenes may be stored in secure storage in the user electronic device.

Embodiments may provide a system, method, and product for managing and applying data controls and privacy to immersive and spatial data within a computing environment. For example, embodiments may provide a system and method for assigning a role or attribute data policy to a scene-graph hierarchy. Embodiments may associate data controls with immersive data. For example, embodiments may store a data policy within a scene-graph data structure and may associate this with the renderable components of the scene-graph.

In another embodiment, a method for may include storing a data policy that is decoupled from the scene-graph and associating this with the renderable components of the scene-graph.

Embodiments may provide an isolation layer that may protect user content during rendering. Embodiments may enforce the data policy by rewriting the scene-graph in a secured isolation layer and executing the render in an insecure computing environment.

In one embodiment, a system and method for enforcing the data policy by rendering and streaming scenes to the client device are disclosed.

In one embodiment, a system and method for enforcing the policy during rendering of the data in a secure enclave on the client or edge device are disclosed.

In one embodiment, a system and method for enforcing the policy by encrypting the scene graph data and providing a rendering environment with a set of encryption keys based on the render or application operator's entitlements are disclosed.

BRIEF DESCRIPTION OF THE DRAWINGS

For a more complete understanding of the present invention, the objects and advantages thereof, reference is now made to the following descriptions taken in connection with the accompanying drawings in which:

FIGS. 7A and 7B illustrate a method for immersive data management in spatial computing according to yet another embodiment;

DETAILED DESCRIPTION OF PREFERRED EMBODIMENTS

Figure 1:
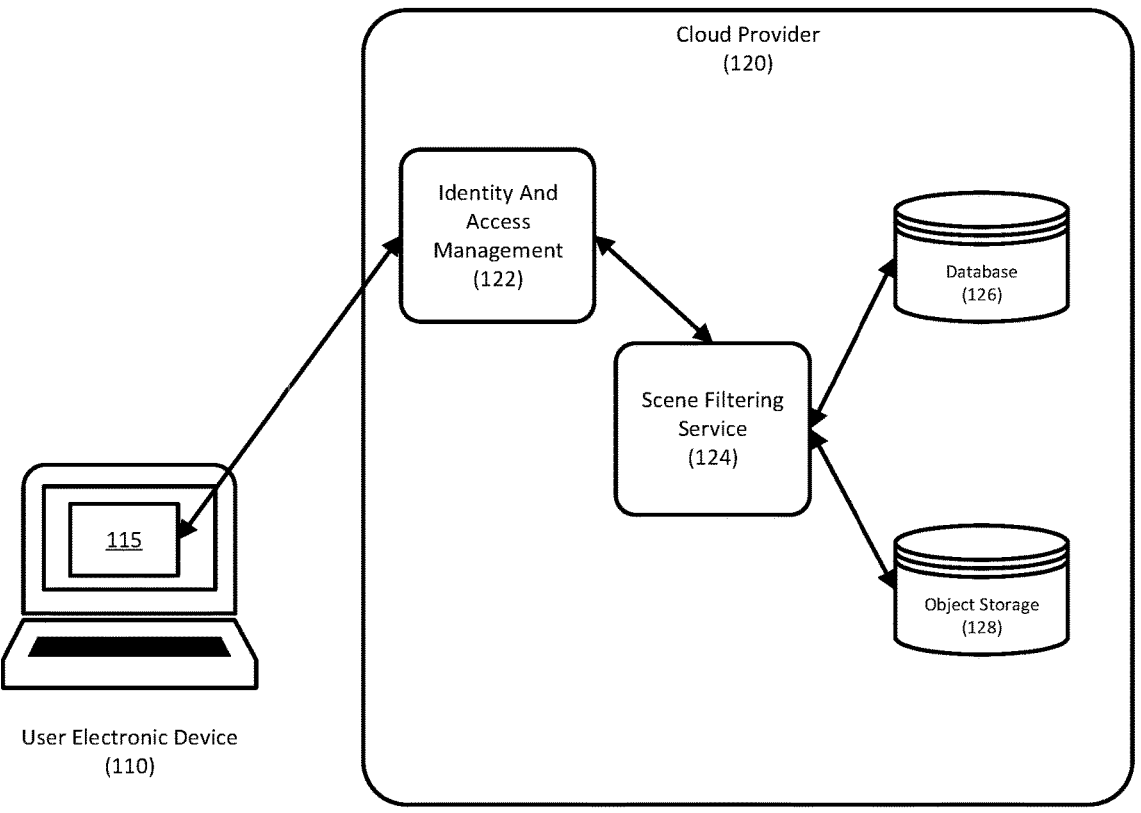
FIG. 1 illustrates a system for immersive data management in spatial computing according to an embodiment.

Systems and methods for immersive data management in spatial computing are disclosed.

In games and other 3D end-user applications, historically, data and application logic are all compiled into a single monolithic application. These applications are typically distributed in binary form and run entirely on the end-user device. Data use and access control is typically governed through an end user license agreement (EULA) or another form of contract between the software provider and the end-user. These applications may run as single or multi-user, where each user may network together into a collaborative environment. Multi-user applications introduce more complexity as application state and resources may be shared amongst all users running the application. These applications may run in somewhat of a turn-based style where users may collaborate or access data asynchronously while each running an individual application state that is later, possibly within milliseconds, independently synched and merged into centralized or distributed main state.

In both types of applications, single and multiuser, the content and the application code have been tightly coupled, and the end-user has limited or no ability to create or introduce unique content within these application environments. More recently, however, solutions created by industry to solve multi-user collaboration across the content creation pipeline are introducing new solutions for standardized decoupled immersive data formats with the ability to generally render universally. Modern day renderers work with hierarchical data, this data is composed of all the attributes, meshes, materials, animations, camera projections, lights, and shading code needed to draw a scene.

Data formats used are indirectly bound to the rendering technology. For example, computational frameworks exist that enable the communication between the scene-graph and the render with numerous real-time and ray-tracing renders commercially available today. These frameworks are often configured to decouple the scene-graph from the renderer allowing for a multiplexed rendering environment where one renderer, for example, could be a path tracer and the other a rasterizer, different systems and workloads benefit accordingly. These systems, however, do not consider data security and therefore will not operate within an enterprise where data security is required. These systems are not configurable for allowing users to opt-in or control content with a virtual reality space from either the content owner or content consumer role.

Embodiments may decouple access control from the system and renderer. Collaborative systems require some level of user registration and access control. Identifying the user is core functionality and the systems will not function otherwise. Systems may use common authentication mechanisms, such as an OAuth 2.0 authorization-based solution.

The system concerns itself with authentication and authorization where authentication is used to validate the identity of the user accessing the system, and authorization determines the resources the end-user can access. The system may be decoupled from but dependent on an identity layer used to obtain user profile information, and an authorization protocol that allows access to protected resources without revealing the end-user identity.

The resources may be controlled by the hosted resource server. Resource groups or attributes in the form of claims are created to provide distinct levels of access to the data running on the collaboration platform. For example, resource groups may be created for users based on age or personal preference. Further, resource groups may be automatically generated, and may also include the inverse as in the concept of being able to opt-out of a certain feature. Attributes provide more flexibility with a more specific description of an action a user may take on a given resource.

When the client requests access to resources controlled by the resource owner, the client may obtain an access token denoting several attributes including claims (e.g., entitlements to access elements in a plurality of scenes), scope, and expiration time. The client may use the access token to access the protected resources hosted by the resource server. The access control, in the form of attribute claims or scope, may determine the resources the user has access to on the hosted application.

Embodiments may create roles and attributes. Roles and attributes are typically created by the content owner. When new content is submitted to the virtual environment, the data owner may define a set of access roles or attribute actions that specify the conditions required for a subject to access the content. For example, a user-interface may present the user with a set of options where the user may select from a list of access control groups or sets of attributes that define a policy for how a user may access 3D content. As another example, an administrator may centrally control the content within the entire system, but this depends on the requirements of the access control used in the system.

Embodiments may assign an access control group or set of attribute actions, and a retention data policy, to a scene-graph using a graphical user interface. A scene-graph is typically implemented as an n-ary tree structure but may also be implemented as a directed acyclic graph and encoded into any popular data format, such as GLTF, USD, JSON, or any other, of the many, text or binary formats used for encoding 3D renderable content. These types of scene-graphs typically include constructs for representing lights, cameras, animations, 3D geometry and other abstract objects. Each construct controls how, or possibly where, an object appears in the scene when rendered. In embodiments, each of these elements, or nodes, may represent a specific governable construct that may be associated with any roles defined previously. To make this association as simple as possible, embodiments may provide a graphical user interface as a visual controller that allows a data owner to assign the initial set of policies to control the rendered content. The data owner may assign a data control based on the level of access control they are entitled. In one embodiment, an entitlement may be assigned to the root of the scene-graph and this entitlement may automatically propagate to all children.

Embodiments may provide fine-grain data access control of immersive data. For example, embodiments may use a tree data structure representation of the renderable data. A renderable scene may be abstracted into a graph or tree hierarchy structure, which allows for a data owner to individually select relevant nodes (or control points), each of which represents a renderable element, and to assign entitlements to those individually. Examples of control points may include layers, mesh or geometric and volumetric data, procedural materials and texture-based materials, lights and light paths, animations, physics, multi-media video, other streaming content, etc.

The selection of a node in the graph allows a data owner to assign a set of entitlement controls to the renderable content within the scene-graph. The data policy enforces who has access to view the content during rendering to the end-user of the system.

The data owner may also assign a data retention and destruction policy in the form of a time to live TTL or no cache header. This policy may extend beyond the expiration of the token and specifically instructs the client of the retention policy on the data.

In another embodiment, the 3D constructs may be generalized into a list-based data abstraction. This also describes the scene using a graphical user interface representation each element in the list is a controllable construct that may be individually selected and used to associate a data control policy with any of the given primitive elements controlling the 3D renderable content and their data retention policy.

Embodiments may provide a system and method for associating and storing the access control policies and the 3D data, including a system and method for storing the data policy within the renderable content, and a method for decoupling the data policy from the renderable content and storing them separately.

When new data is created, a control policy may be assigned to the data as follows. First, the data may be parsed and converted into a renderable image to allow the visual configuration of the data policy. The parsing algorithm used may be dependent on the data format used for encoding the renderable content. For example, embodiments may parse the data in the data format by parsing its low-level file format and encoding the renderable content contained into a graph structure.

Once the graph data structure has been created, nodes may be identified using any of the pre, post, or in-order tree walks. During this walk, each node's data type is inspected, and entitlements may be decoupled from the renderable data. An entry for each data type may be created and added to a centralized database. Embodiments may store a mapping of node's identifier to the list of groups specified for access control in a separate database. A key benefit of this implementation is that external storage of the entitlements reduces the run-time cost of updating the roles associated with each node significantly.

In another embodiment, entitlement association may be enabled by writing the group entitlement directly into the metadata of the node and storing it directly in the file or object file. The approach is simple and cost effective as it does not require any additional data storage but can result in a write-time performance degradation as the maintenance of entitlement structure relies on manipulating the scene content itself.

Using the graphical representation that is independent or embedded into the content creation tools, end users may modify access control for a given branch of the graph. The meaningful nodes represent individual mesh data for a given stage and the attribute-based access control may encoded accordingly for a given region or environment.

Referring to FIG. 1, a system for immersive data management in spatial computing is disclosed according to an embodiment. Embodiments may operate at runtime as either a batch mode program producing a single final scene or an interactive program running an event loop. In either case, a renderable scene may be generated, executed, and rasterized on either a CPU, GPU, or other processor. During rendering, an example of enforcing entitlements on a controlled instance of data would be where one financial advisor user is not allowed to view a specific entity because that entity is managed by a different financial advisor user.

Embodiments may enforce a data policy by rewriting the scene-graph in a secured isolation layer (e.g., a secure compute layer of cloud provider 120) while executing the render in an insecure computing environment (e.g., user electronic device 110). These environments may be physically isolated, and possibly geographically independent. FIG. 1 depicts the isolation layer and scene graph generation based on the user's entitlements to the access-controlled data. The elements rendered in each scene are authorized and controlled outside of the end-user's device and execution environment.

As used herein, a scene graph, as used in 3D graphics applications, may be a hierarchical data structure that is typically implemented as an n-ary tree structure, but may also be implemented as a directed acyclic graph. The nodes in the graph may represent abstract computer graphic constructs, such as lights, cameras, animations, mesh geometry, transformations, physics, meta data (for entitlements), and other concepts for layout, color, and timing events when rendered. A scene graph may be encoded into a programming language independent data format, such as JSON. The entitlements may be embedded into the scene graph or stored independently as mapped to the elements.

The system and method for enforcing the policy by rewriting the scene-graph in a secured isolation layer and executing the render in an insecure computing environment makes a request, during the render loop, to rebuild the tree based on the user's state and entitlements update.

System 100 may include user electronic device 110, which may be a computer (desktop, laptop, notebook, etc.), a smart device (e.g., smart phone, smart watch, etc.), an Internet of Things (IoT) appliance, a gaming console, a virtual reality or augmented reality headset, combinations thereof, etc. User electronic device 110 may execute computer program 115, such as a computer program that presents spatial data. Computer program 115 may include a scene rendering application that may take elements from a scene, generate an image, and display the image on a display of user electronic device 110.

System 100 may further include cloud provider 120, which may provide a source of data, including immersive data. Cloud provider 120 may provide authentication using identity and access management service 122, scene filtering service 124, database 126, and object storage 128.

Identity and access management service 122 may authorize a user and/or computer program 115 to access content.

Scene filtering service 124 may use entitlements to determine which elements of a scene to return to computer program 115.

Database 126 may store an element-by-element breakdown of a scene. Each element may be associated with an entitlement.

Object storage 128 may store objects for each scene. The objects may be stored on an element-by-element basis.

Figure 2:
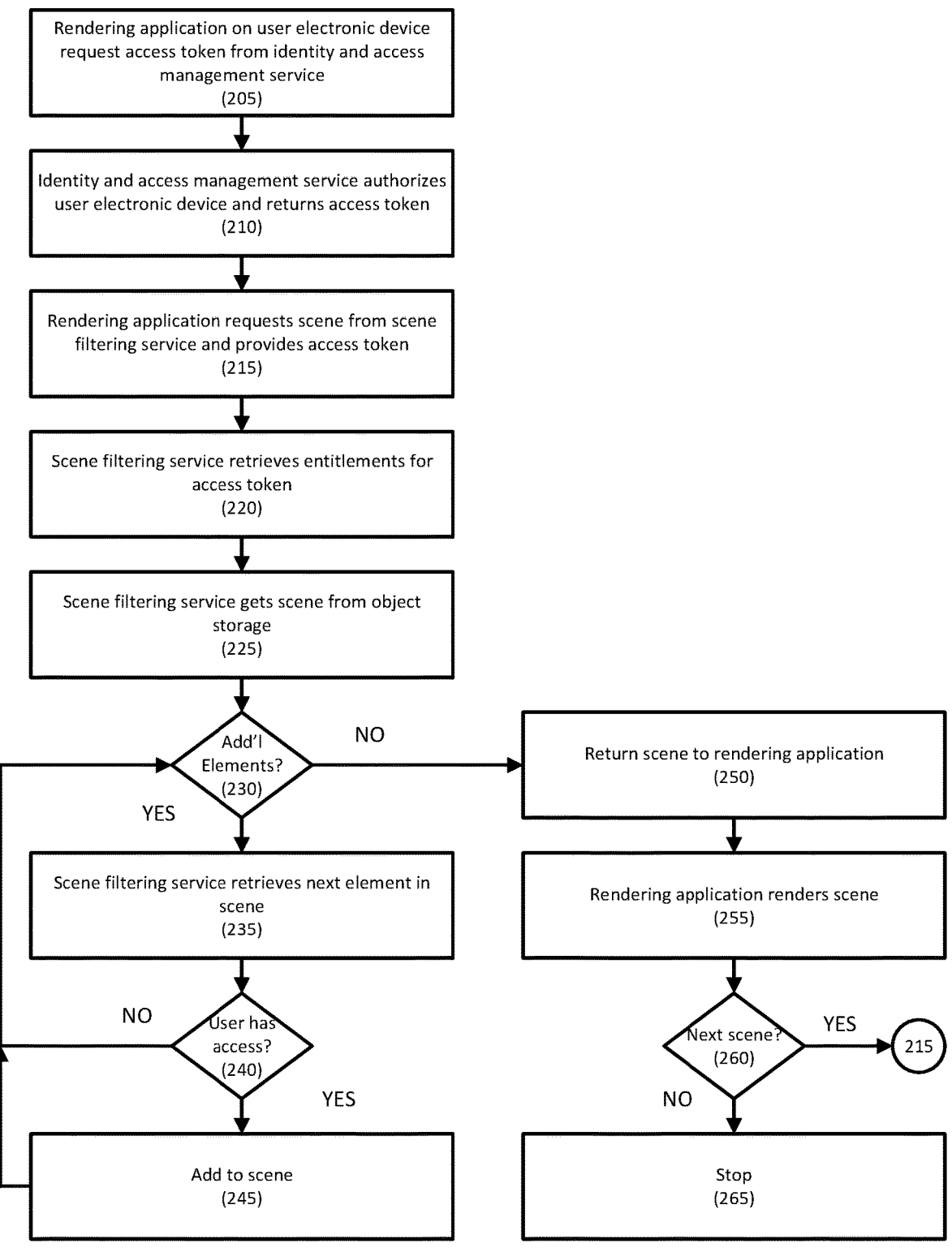
FIG. 2 illustrates a method for immersive data management in spatial computing according to an embodiment.

Referring to FIG. 2, a method for immersive data management in spatial computing is disclosed according to an embodiment.

In step 205, a rendering application executed by a user electronic device may request an access token from an identity and access management service. In one embodiment, the rendering application may provide a username and password, a biometric, an OAuth token, etc. with the request.

In step 210, the identity and access management service may authorize the user electronic device and may return the access token, such as a web-based access token, to the rendering application. For example, the token may be a JSON Web Token, and the claims may in the payload may represent the user's entitlements to access elements of one or more scene.

In one embodiment, the identity and access management service may embed the roles and/or entitlements in the token.

In step 215, the rendering application may request a scene from a scene filtering service. The rendering application may provide the scene filtering service with the access token.

In step 220, the scene filtering service may retrieve the entitlements that are mapped to the access token. In another embodiment, the scene filtering service may extract the entitlements from the access token.

In step 225, the scene filtering service may retrieve a scene from object storage, and in step 230, may check to see if there are elements to evaluate. In one embodiment, as described above, the scene may be parsed into multiple elements, and each element may have an entitlement requirement.

If there are, in step 235, the scene filtering service may retrieve the next element in the scene.

In step 240, based on the entitlements, the scene filtering service may check to see if the user is entitled to access the element. If the user is, in step 245, the element may be added to the scene to be rendered. If the user is not entitled, the element is not added to the scene. The process may then return to step 230.

If, in step 230, there are no additional elements in the scene, in step 250, the scene with the entitled elements may be returned to the rendering application which, in step 255, may render the scene with the entitled elements. The rendered scene may then be displayed on a display.

In step 260, the rendering application may check to see if there is another scene to retrieve. If there is, the process may return to step 215. If there is not, in step 265, the process may stop.

Figure 3:
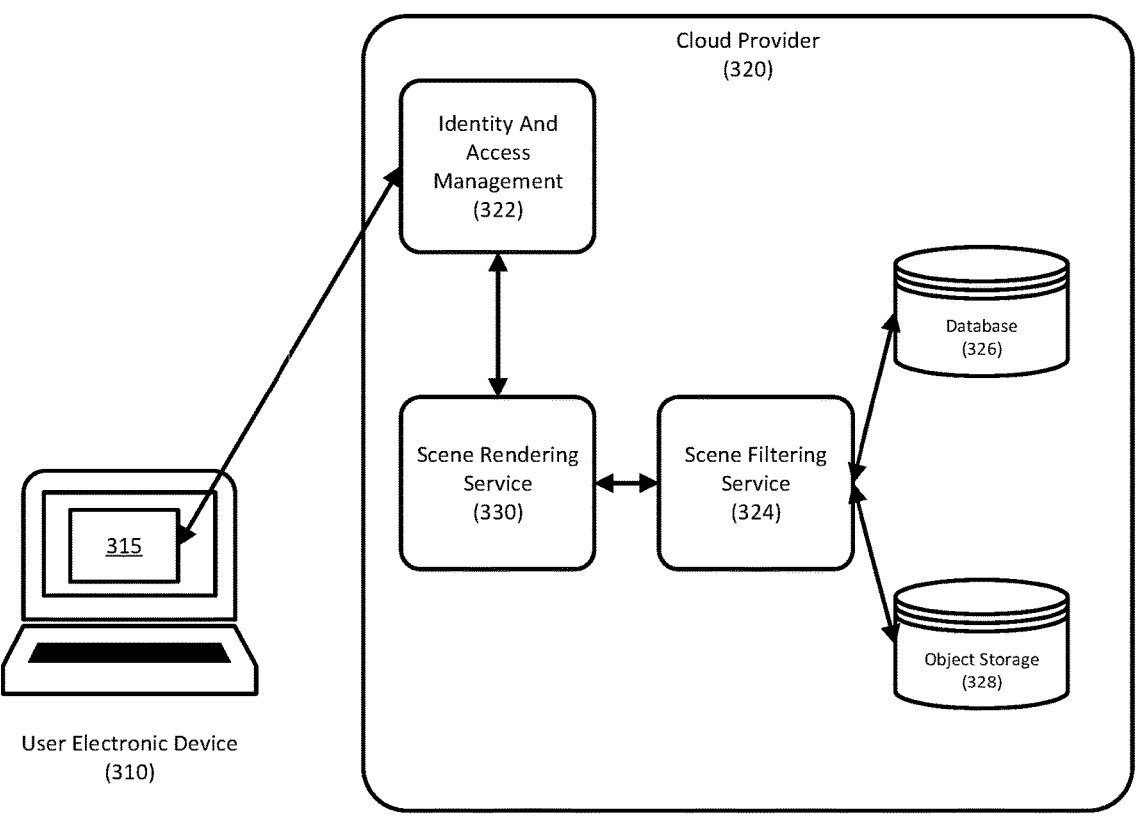
FIG. 3 illustrates a system for immersive data management in spatial computing according to another embodiment.

Referring to FIG. 3, a system for immersive data management in spatial computing is disclosed according to another embodiment.

System 300 may enforce the data policy by rendering and streaming scenes or frames to the user electronic device 310. System 300 moves the rendering dependency entirely from user electronic device 310 into the isolation layer (e.g., a secure compute layer in cloud provider 320) running independently of the executing process. User electronic device 310 may render a scene made up of these rasterized image scenes provided by isolation layer.

User electronic device 310 may render the scenes to the display as a user triggers input events that are marshaled to the rendering server where the application state may be updated and the scene graph is generated based on the end-users' entitlements.

System 300 may include user electronic device 310, which may be a computer (desktop, laptop, notebook, etc.), a smart device (e.g., smart phone, smart watch, etc.), an Internet of Things (IoT) appliance, a gaming console, a virtual reality or augmented reality headset, combinations thereof, etc. User electronic device 310 may execute computer program 315, such as a computer program that presents spatial data.

Authentication using identity and access management service 322 may authorize a user and/or computer program 115 to access content.

Scene rendering service 330 may render a scene for computer program 315.

Scene filtering service 324 may use entitlements to determine which elements of a scene to return to scene rendering service 330.

Database 326 may store an element-by-element breakdown of a scene. Each element may be associated with an entitlement.

Object storage 328 may store objects for each scene. The objects may be stored on an element-by-element basis.

Figure 4:
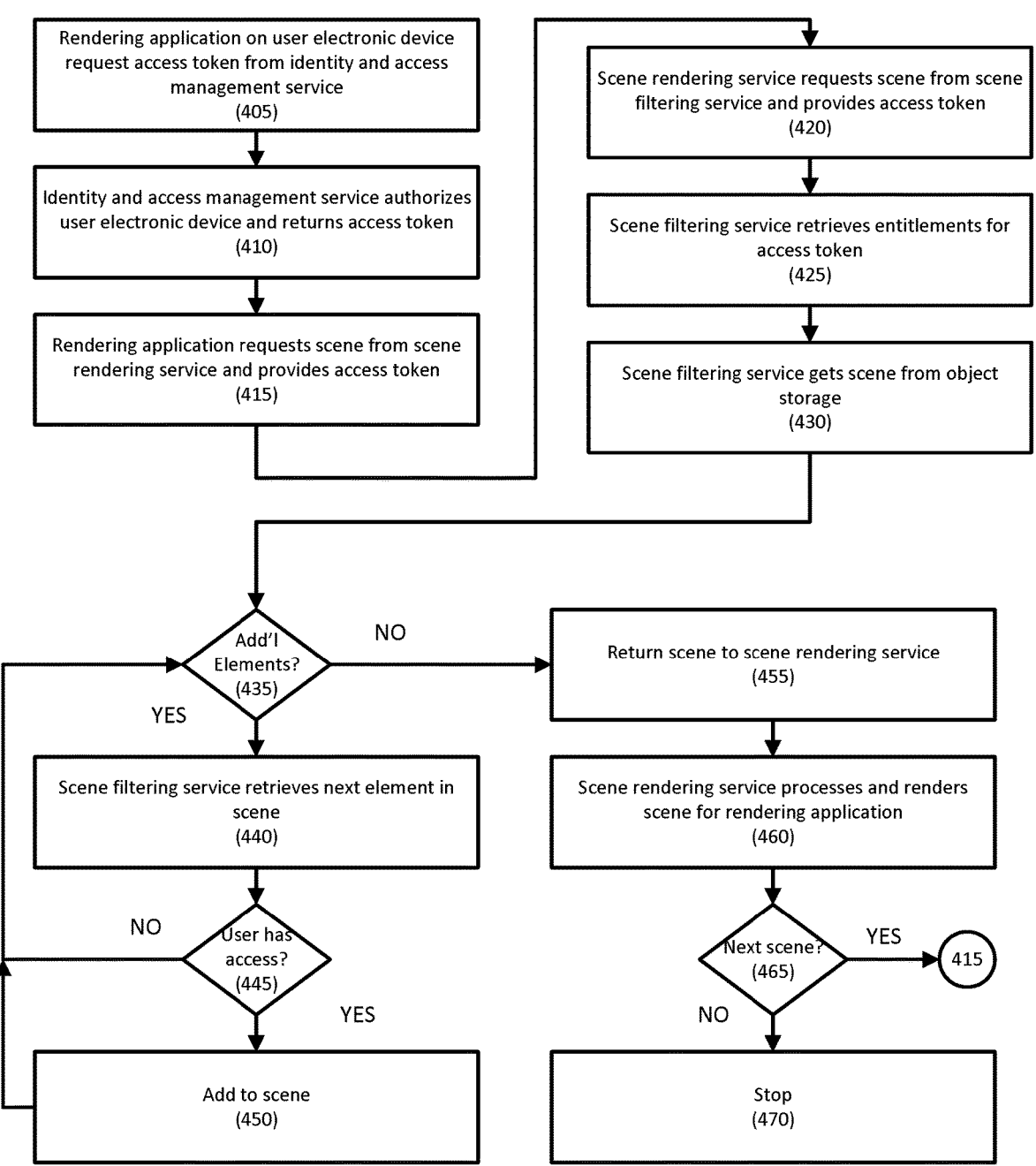
FIG. 4 illustrates a method for immersive data management in spatial computing according to another embodiment.

Referring to FIG. 4, a system for immersive data management in spatial computing is disclosed according to another embodiment.

In step 405, a rendering application, such as a computer program, executed by a user electronic device may request an access token from an identity and access management service. This may be similar to step 205, above.

In step 410, the identity and access management service may authorize the user electronic device and may return an access token to the rendering application. This may be similar to step 210, above.

In step 415, the rendering application may request a scene from a scene rendering service. The rendering application may provide the scene rendering service with the access token. This may be similar to step 215, above.

In step 420, the scene rendering service may request a scene from a scene filtering service. In one embodiment, the scene rendering service may provide the access token to the scene rendering service.

In step 425, the scene rendering service may retrieve the entitlements that are mapped to the access token. This may be similar to step 220, above.

In step 430, the scene filtering service may retrieve the scene from object storage, and in step 435, may check to see if there are elements to evaluate. In one embodiment, as described above, the scene may be parsed into multiple elements, and each element may have an entitlement requirement. These steps may be similar to steps 225 and 230, above.

If there are, in step 440, the scene filtering service may retrieve the next element in the scene.

In step 445, based on the entitlements, the scene filtering service may check to see if the user is entitled to access the element. This may be similar to step 240, above. If the user is, in step 450, the element may be added to the scene to be rendered. This may be similar to step 245, above.

If the user is not entitled, the element is not added to the scene. The process may then return to step 435.

If, in step 435, there are no additional elements in the scene, in step 455, the scene with the entitled elements may be returned to the scene rendering service. In step 460, the scene rendering service may then process and render the scene for the rendering application. The rendered scene may then be displayed on a display.

In step 465, the rendering application may check to see if there is another scene to retrieve. If there is, the process may return to step 415. If there is not, in step 470, the process may stop.

Figure 5:
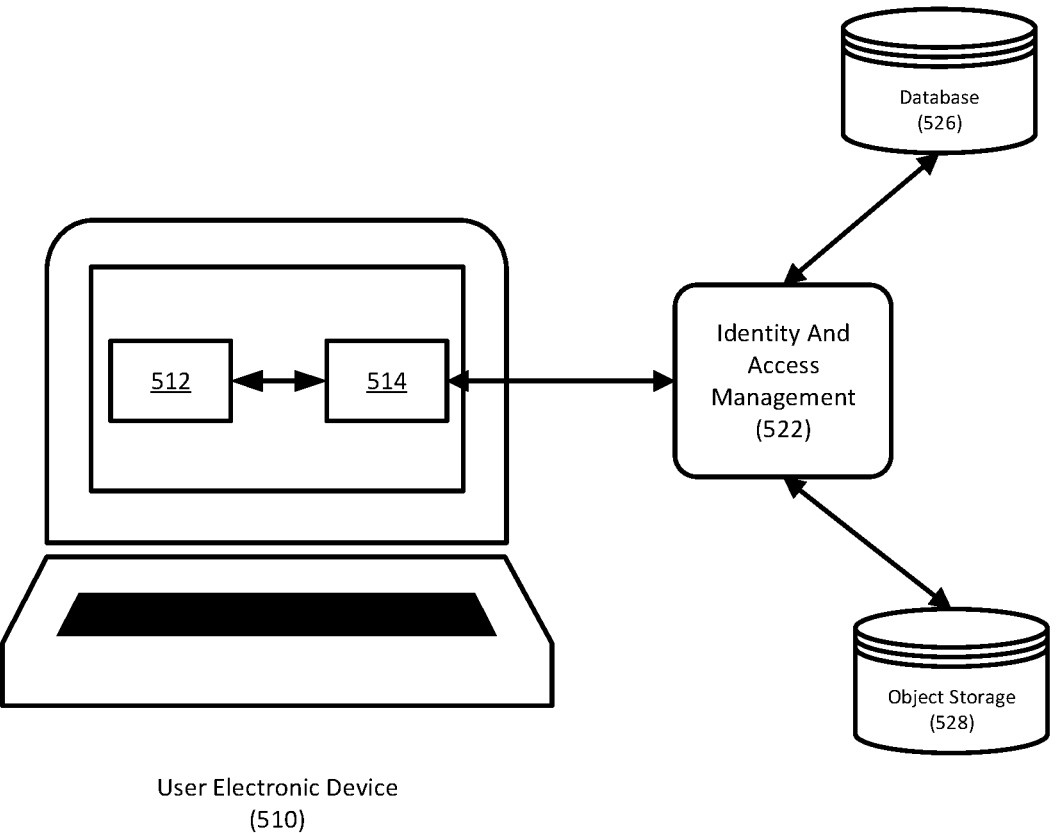
FIG. 5 illustrates a system for immersive data management in spatial computing according to another embodiment.

Referring to FIG. 5, a system for immersive data management in spatial computing is disclosed according to another embodiment.

System 500 may enforce the data policy during rendering of the data in a secure or trusted execution environment on the user electronic device 510. Trusted execution environment 514 may provide isolated execution for pruning the scene graph based on the users' entitlements or running the rendering entirely. Embodiments may execute the enforcement of either entitlements embedded directly into the data structure or by making an independent request to an external database managing the entitlement data.

System 500 may include user electronic device 510, which may be a computer (desktop, laptop, notebook, etc.), a smart device (e.g., smart phone, smart watch, etc.), an Internet of Things (IoT) appliance, a gaming console, a virtual reality or augmented reality headset, combinations thereof, etc. User electronic device 510 may execute computer program 512, such as a computer program that presents spatial data, and may include trusted execution environment 514.

Database 526 may store an element-by-element breakdown of a scene. Each element may be associated with an entitlement. Database 526 may be stored on user electronic device 510 or may be stored remotely.

Object storage 528 may store objects for each scene. The objects may be stored on an element-by-element basis. Object storage 528 may be stored on user electronic device 510 or may be stored remotely.

Identity and access management service 522 may authorize a user and/or computer program 512 to access content. Identity and access management service 522 may be provided on user electronic device 510 or may be provided remotely.

Figure 6:
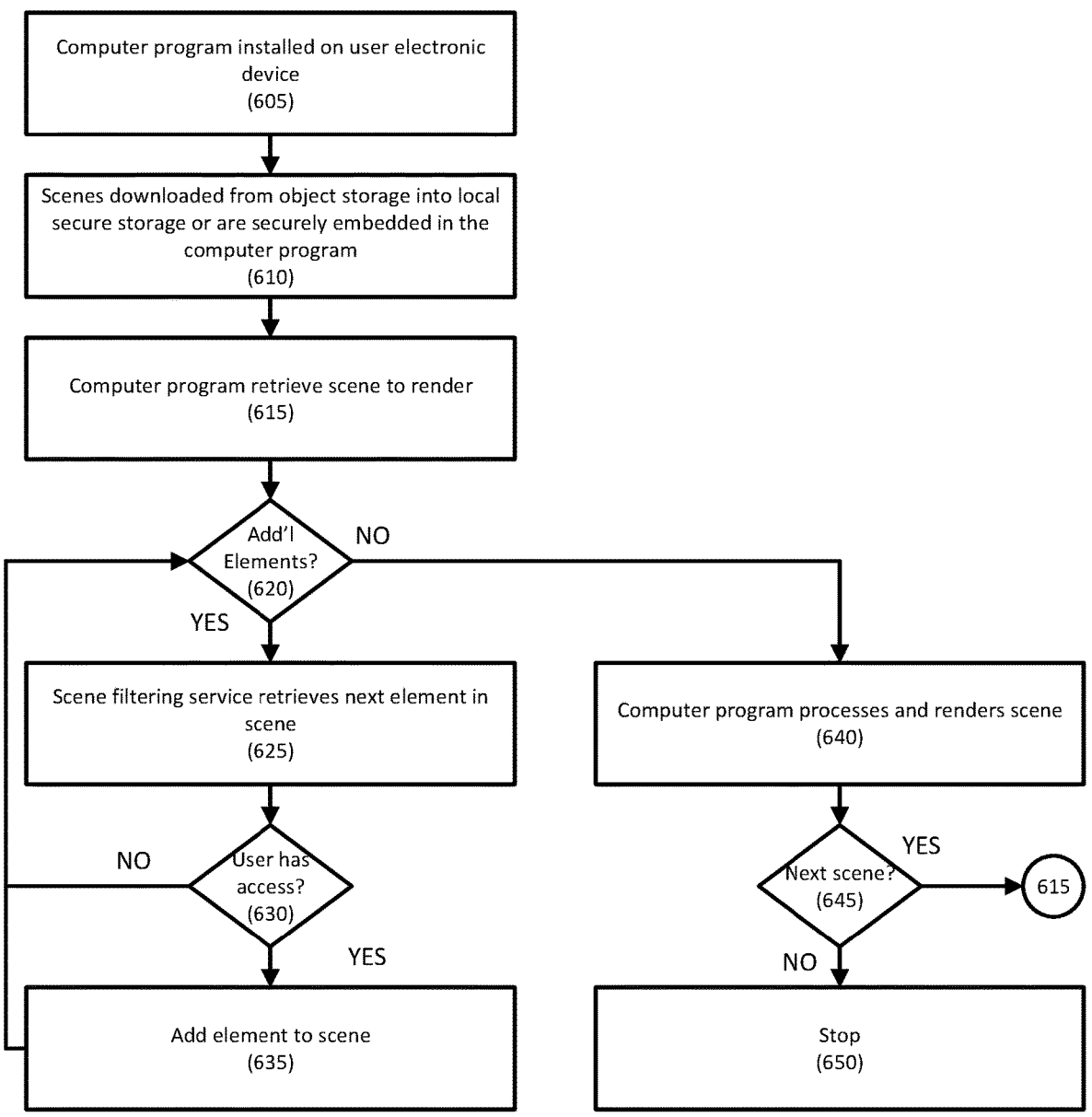
FIG. 6 illustrates a method for immersive data management in spatial computing according to another embodiment.

Referring to FIG. 6, a method for immersive data management in spatial computing is disclosed according to another embodiment.

In step 605, a computer program, which may include a scene rendering service, may be installed on a user electronic device, such as a computer, smart device, etc.

In step 610, the computer program may be provided with scenes. In an embodiment, the scenes may be downloaded from object storage into local secure storage on the user electronic device, or they may be securely embedded in the computer program.

In step 615, the computer program may retrieve a scene to render from local secure storage, or from the computer program itself.

In step 620, the computer program may determine if there are elements in the scene to evaluate. If there are, in step 625, the scene filtering service may retrieve the next element in scene.

In step 630, the computer program may determine if the user is entitled to access the element based on, for example, the user entitlements. If the user is entitled the element, in step 635, the element may be added to the scene to be rendered.

If the user is not entitled to access the scene, the process may return to step 620.

If, in step 620, there are no additional elements to evaluate in step 640, the computer program may render the entitled elements for the scene, and may then determine, in step 645, if there is another scene to render. If there is, the process may return to step 615 to retrieve the next scene.

If there are no additional scenes to render, in step 650, the process may stop.

Embodiments may also enforce a data policy during rendering using encryption. This may be a zero-trust model requiring the client to verify each rendering with a set of encryption keys that may be provided to the user based on the confidence of user, the device identity, and/or other attributes in combination with the user's authentication.

Embodiments may execute the enforcement by decrypting the relevant entities directly from the data structure at render time or by making a pre-fetched request to an external database managing the data.

Figure 7B:
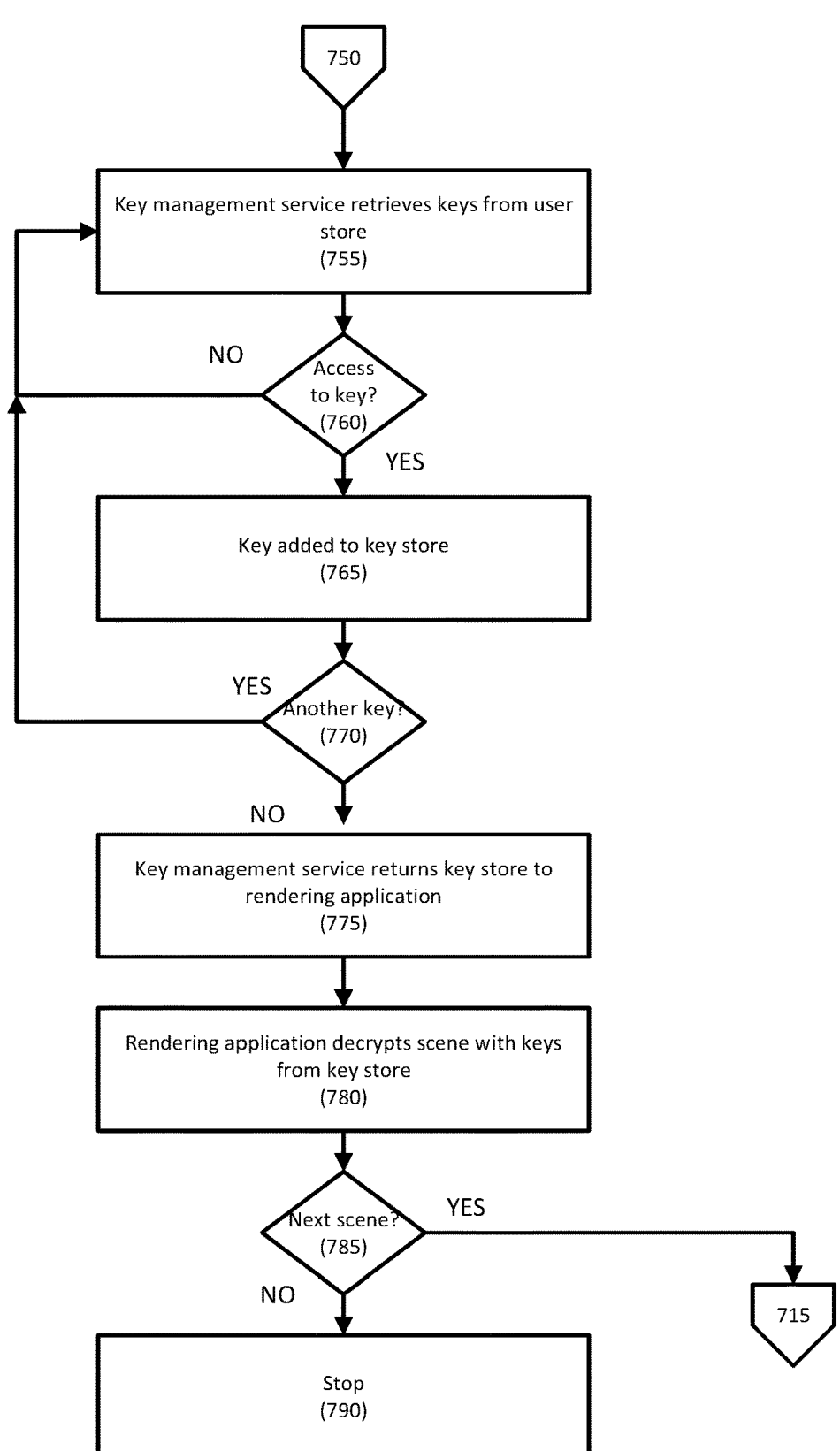

Referring to FIGS. 7A and 7B, a method for immersive data management in spatial computing is disclosed according to another embodiment.

In step 705, a computer program executed by a user electronic device, which may include a rendering application, may request an access token from an identity and access management service. The identity and access management service may be provided in the cloud.

In step 710, the identity and access management service may authorize the user electronic device and may return an access token to the user electronic device.

In step 715, the computer program may request a scene from a scene filtering service and may provide the access token with the request.

In step 720, the scene filtering service may retrieve the scene from object storage, and in step 725, may determine if there are elements in the scene to evaluate. If there are, in step 730, the scene filtering service may retrieve the next element in the scene.

In step 735, the scene filtering service may encrypt the element with an encryption key and may add the encryption key to a user store. In one embodiment, a new key may be generated for and used to encrypt each element in the scene.

In another embodiment, the same key may be used to encrypt multiple elements.

If there are no additional elements to evaluate, in step 740, the scene filtering service may save the scene with the encrypted elements in, for example, cloud storage.

In step 745, the scene filtering service may fetch the scene with the encrypted elements and may return the scene to the rendering application.

In step 750, the rendering application may request the keys to decrypt elements in scene. For example, the request may be made to a key service, a module of the scene filtering service, etc.

In step 755, the key service or module to the scene filtering service may retrieve the stored keys for the scene from the user store. In one embodiment, the scene filtering service may extract the entitlements from the access token or may retrieve entitlements associated with the access token.

In step 760, the scene filtering service may determine whether the user is entitled to access the key. If so, in step 765, the key is added to the key store. If not, the key is not added to the key store.

In step 770, if there is another key, in step 775, the scene filtering service may return the keys in the key store to the rendering application, and in step 780, may decrypt the elements from the scene with the keys.

In step 785, the computer program may determine if there is another scene to retrieve. If there is, the process may return to step 715. If not, in step 790, the process may stop.

The system may run as a batch mode program producing a single final scene or an interactive program running an event loop, something like the rendering function of a video game loop as described: "A game loop runs continuously during gameplay. Each turn of the loop, it processes user input without blocking, updates the game state, and renders the game. It tracks the passage of time to control the rate of gameplay." [3] In either case, batch, or event loop, a renderable scene is generated, executed, and rasterized on either a CPU, GPU, or other processor. During rendering, an example of enforcing entitlements on a controlled instance of data would be where one financial advisor user is not allowed to view a specific entity because that entity is managed by a different financial advisor user.

Figure 8:
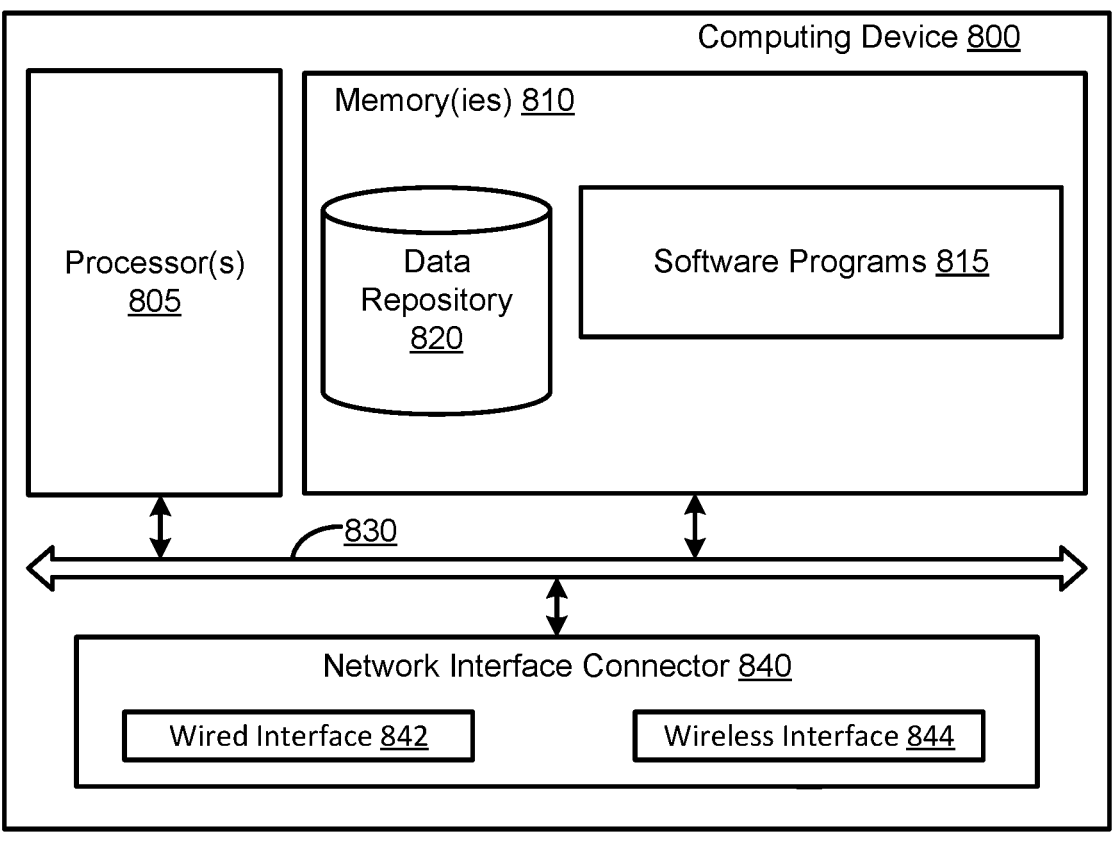
FIG. 8 illustrates a block diagram of a technology infrastructure and computing device for implementing certain embodiments of the present disclosure.

FIG. 8 depicts an exemplary computing system for implementing aspects of the present disclosure. FIG. 8 depicts exemplary computing device 800. Computing device 800 may represent the system components described herein. Computing device 800 may include processor 805 that may be coupled to memory 810. Memory 810 may include volatile memory. Processor 805 may execute computer-executable program code stored in memory 810, such as software programs 815. Software programs 815 may include one or more of the logical steps disclosed herein as a programmatic instruction, which may be executed by processor 805. Memory 810 may also include data repository 820, which may be nonvolatile memory for data persistence. Processor 805 and memory 810 may be coupled by bus 830. Bus 830 may also be coupled to one or more network interface connectors 840, such as wired network interface 842 or wireless network interface 844. Computing device 800 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or main-frame, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Pro-grammable Logic Device), PLA (Programmable Logic Array), or PAL (Programmable Array Logic), or any other device or arrangement of devices that is capable of imple-menting the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically dis-tinct locations and connected so as to communicate in any suitable manner. Additionally, it is appreciated that each of the processor and/or the memory may be composed of different physical pieces of equipment. Accordingly, it is not necessary that the processor be one single piece of equip-ment in one location and that the memory be another single piece of equipment in another location. That is, it is con-templated that the processor may be two pieces of equip-ment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one dis-tinct component as described above may be performed by two distinct components.

In a similar manner, the memory storage performed by two distinct memory portions as described above, in accor-dance with a further embodiment, may be performed by a single memory portion. Further, the memory storage per-formed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular program-ming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instruc-tions and/or data used in the practice of embodiments may utilize any compression or encryption technique or algo-rithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instruc-tions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and soft-ware used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbut-ton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
requesting, by a computer program executed on a user electronic device and from an identity and access management service executed in a cloud environment, an access token;
receiving, by the computer program and from the identity and access management service, the access token identifies user entitlements to access a plurality of elements in a plurality of renderable scenes, wherein each renderable scene is parsed into a plurality of elements, and each of the elements is associated with a user entitlement;
requesting, by the computer program, one of the plurality of renderable scenes from a scene filtering service, the request comprising the access token;
identifying, by the scene filtering service, the user entitlements from the access token;
retrieving, by the scene filtering service, the requested renderable scene comprising a subset of the elements;
adding, by the scene filtering service, the elements that the user is entitled to based on the user entitlements to a renderable scene to be displayed;
returning, by the scene filtering service, the renderable scene to be displayed to the computer program; and displaying, by the computer program, the renderable scene to be displayed.

2. The method of claim 1, wherein the computer program comprises a scene rendering application.

3. The method of claim 1, wherein the access token comprises a JavaScript Object Notation (JSON) token comprising a plurality of claims representing user entitlements to access the elements.

4. The method of claim 1, wherein the scene filtering service is executed in the cloud environment.

5. The method of claim 1, wherein the elements are stored in object storage.

6. The method of claim 1, wherein a scene rendering service executed in the cloud environment renders the renderable scene for the computer program.

7. A system, comprising:
a user electronic device executing a computer program; and
a cloud environment executing an identity and access management service, a scene filtering service, and comprising an object storage storing a plurality of renderable scenes and a plurality of elements for the renderable scenes, wherein each renderable scene is parsed into a plurality of elements, and each of the elements is associated with a user entitlement;
wherein:
the computer program requests an access token from the identity and access management service;
the identity and access management service provides the access token identifying a plurality of user entitlements to access the elements;
the computer program requests one of a plurality of scenes from the scene filtering service with the access token;
the scene filtering service identifies the user entitlements from the access token;
the scene filtering service retrieves the requested renderable scene comprising a subset of the elements;
the scene filtering service adds the elements that the user is entitled to based on the user entitlements to a renderable scene to be displayed;
the scene filtering service returns the renderable scene to be displayed to the computer program; and
the computer program displays the renderable scene to be displayed.

8. The system of claim 7, wherein the computer program comprises a scene rendering application.

9. The system of claim 8, wherein the access token comprises a JavaScript Object Notation (JSON) token comprising a plurality of claims representing user entitlements to access the elements.

10. The system of claim 8, wherein the scene filtering service is executed in the cloud environment.

11. The system of claim 8, wherein the computer program executed on the user electronic device comprises a scene rendering service.

12. The system of claim 8, wherein the cloud environment further comprises a scene rendering service that renders the scene for the computer program.

13. A method, comprising:
receiving, by a user electronic device associated with a user, a plurality of renderable scenes, wherein each renderable scene is parsed into a plurality of elements, and each of the elements is associated with a user entitlement;

retrieving, by a computer program executed by the user electronic device, one of the plurality of renderable scenes and the plurality of elements for the scene;

determining, by the computer program, that the user is entitled to access each of the plurality of elements based on the user entitlements to access the elements;

adding, by the computer program, the entitled elements to a renderable scene to be displayed; and rendering, by the computer program, the renderable scene to be displayed.

14. The method of claim 13, wherein the plurality of renderable scenes are embedded in the computer program.

15. The method of claim 14, wherein the plurality of renderable scenes are stored in secure storage in the user electronic device.

* * * * *